United States Patent [19]
Gregorovich et al.

[11] Patent Number: 6,080,816
[45] Date of Patent: Jun. 27, 2000

[54] COATINGS THAT CONTAIN REACTIVE SILICON OLIGOMERS

[75] Inventors: Basil V. Gregorovich, Wilmington, Del.; Isidor Hazan, Clementon, N.J.; Lech Wilczek, Wilmington, Del.

[73] Assignee: E. I. du Pont de Nemours and Company, Wilmington, Del.

[21] Appl. No.: 08/969,198

[22] Filed: Nov. 10, 1997

[51] Int. Cl.⁷ .......................... C08G 77/00; C08G 77/16; C08G 77/48

[52] U.S. Cl. .......................... 525/100; 525/101; 528/10; 528/12; 528/25; 528/26; 528/28; 528/29; 528/32; 528/33; 528/43

[58] Field of Search .......................... 525/100, 101; 528/10, 12, 25, 26, 28, 29, 32, 33, 43

[56] References Cited

U.S. PATENT DOCUMENTS

| | | | |
|---|---|---|---|
| H1279 | 1/1994 | Stephenson | 524/317 |
| 4,221,697 | 9/1980 | Osborn et al. | |
| 4,251,576 | 2/1981 | Osborn et al. | 428/331 |
| 4,267,088 | 5/1981 | Kempf | |
| 4,367,313 | 1/1983 | Rizk et al. | 525/102 |
| 4,376,190 | 3/1983 | Schultz et al. | 525/333.1 |
| 4,377,676 | 3/1983 | Gauthier et al. | 528/26.5 |
| 4,413,086 | 11/1983 | Chang et al. | 524/386 |
| 4,446,292 | 5/1984 | Chang et al. | 528/29 |
| 4,467,081 | 8/1984 | Chang et al. | 528/26 |
| 4,501,872 | 2/1985 | Chang et al. | 528/18 |
| 4,565,760 | 1/1986 | Schank | 430/66 |
| 4,613,451 | 9/1986 | Chang et al. | 252/182 |
| 4,652,610 | 3/1987 | Dowbenko et al. | 525/100 |
| 4,678,835 | 7/1987 | Chang et al. | 525/100 |
| 4,732,929 | 3/1988 | Chang et al. | 524/541 |
| 4,766,185 | 8/1988 | Ryntz et al. | 525/479 |
| 4,810,759 | 3/1989 | Ryntz | 525/440 |
| 4,904,504 | 2/1990 | Isozaki et al. | 427/387 |
| 5,051,473 | 9/1991 | Tabuchi et al. | 525/100 |
| 5,066,698 | 11/1991 | Hazan et al. | 524/269 |
| 5,066,722 | 11/1991 | Nakano et al. | 525/162 |
| 5,091,460 | 2/1992 | Seto et al. | 524/492 |
| 5,182,174 | 1/1993 | Stephenson | 428/450 |
| 5,190,804 | 3/1993 | Seto et al. | 428/192 |
| 5,219,694 | 6/1993 | Anno et al. | 430/106.6 |
| 5,225,510 | 7/1993 | Bank et al. | 528/13 |
| 5,230,962 | 7/1993 | Stephenson | 428/423.1 |
| 5,250,605 | 10/1993 | Hazan et al. | 524/504 |
| 5,254,619 | 10/1993 | Ando | 524/504 |
| 5,344,880 | 9/1994 | Nambu et al. | 525/100 |
| 5,369,153 | 11/1994 | Barsotti et al. | 523/429 |
| 5,371,151 | 12/1994 | Berge et al. | 525/377 |
| 5,371,161 | 12/1994 | Knott | 528/9 |
| 5,376,704 | 12/1994 | Barsotti | 523/414 |
| 5,376,706 | 12/1994 | Barsotti et al. | 523/434 |
| 5,391,674 | 2/1995 | Hara et al. | 528/14 |
| 5,399,607 | 3/1995 | Nanbu et al. | 524/385 |
| 5,426,168 | 6/1995 | Witucki | 528/23 |
| 5,431,791 | 7/1995 | December et al. | 204/181 |
| 5,455,080 | 10/1995 | van Ooij | 427/470 |
| 5,501,929 | 3/1996 | Kato et al. | 430/49 |
| 5,506,325 | 4/1996 | Swarup et al. | 526/318.41 |
| 5,696,179 | 12/1997 | Chawla | 522/90 |

FOREIGN PATENT DOCUMENTS

| | | |
|---|---|---|
| 0 401 668 | 12/1990 | European Pat. Off. |
| 0 419 669 A1 | 4/1991 | European Pat. Off. |
| 0 900 832 A2 | 3/1999 | European Pat. Off. |
| 0 918 062 | 5/1999 | European Pat. Off. |
| 197 36 736 A1 | 2/1999 | Germany |
| 59-168074 | 9/1984 | Japan |
| 63-105019 | 5/1988 | Japan |
| 3-97734 | 4/1991 | Japan |
| 3-139660 | 6/1991 | Japan |
| 3-200974 | 9/1991 | Japan |
| 4-200681 | 7/1992 | Japan |
| 5-8506 | 1/1993 | Japan |
| 5-9295 | 1/1993 | Japan |
| 5-108676 | 3/1993 | Japan |
| 5-101116 | 4/1993 | Japan |
| 6-6833 | 1/1994 | Japan |
| 6-47057 | 3/1994 | Japan |
| 6-340709 | 12/1994 | Japan |
| 9-157584 | 6/1997 | Japan |
| 9-328652 | 12/1997 | Japan |
| 1089519 | of 0000 | United Kingdom |
| 1510801 | of 0000 | United Kingdom |
| 2 212 163 | 7/1989 | United Kingdom |

OTHER PUBLICATIONS

Kuriyama et al., JP64–74275 (1989).

*Primary Examiner*—Jeffrey C. Mullis
*Attorney, Agent, or Firm*—James A. Costello; Sudhir G. Deshmukh

[57] ABSTRACT

A coating comprising the silated reaction product of $R^1(OH)_m$ and $OCN(CH_2)_t SiR^4(OR^5)_2$ and/or $R^2-(SiYX_2)_n$; a graft copolymer having an acrylic polymer based backbone and stabilizing arms comprising ethylenically unsaturated monomer, the backbone being insoluble and the arms being soluble in the composition; a melamine crosslinker; and an acrylic polyol; m, n, t, $R^1$, $R^2$, $R^4$, $R^5$, X and Y being defined in the text.

25 Claims, No Drawings

6,080,816

COATINGS THAT CONTAIN REACTIVE SILICON OLIGOMERS

BACKGROUND OF THE INVENTION

This invention concerns a composition comprising a silicon component, a stable non-aqueous dispersion, a crosslinker and an organic polyol, which composition cures to provide mar and etch resistant coatings particularly useful as a topcoat in multi-layered coating systems.

A number of patents disclose silicon-containing curable coatings, all of them lacking the particular combination of components that make the instant compositions so effective in resistance to mar and etch. Representative of such patents is U.S. Pat. No. 4,467,081.

Basecoat-clearcoat systems have found wide acceptance in the past decade as automotive finishes. Continuing effort has been directed to such coating systems to improve the overall appearance, the clarity of the topcoat, and the resistance to deterioration. Further effort has been directed to the development of coating compositions having low volatile organic content (VOC). A continuing need exists for coating formulations which provide outstanding performance characteristics after application, and particularly mar-resistance and resistance to environmental etching. Heretofore, mar-resistant coatings were attained by softening the coating, which depreciates other performance characteristics. The instant invention overcomes this problem.

SUMMARY OF THE INVENTION

This invention concerns a coating composition comprising the following components in amounts based on total weight of the composition:

I) from 0 to 50 percent of the reaction product of a polyol of the formula

with

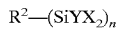

the reaction product having a weight average molecular weight less than about 10,000, preferred less than about 3,000;

II) from 0 to 50 percent of a graft copolymer comprising a backbone of acrylic polymer and, grafted thereto, a plurality of substantially linear stabilizer arms containing at least about 2 percent of ethylenically unsaturated monomer with functionality that reacts with at least one of components I, III and V, the backbone being substantially insoluble and the stabilizer arms being substantially soluble in the composition;

III) from 0 to 30, preferred 0 to 20 percent, of an alkylated melamine formaldehyde crosslinking agent;

IV) from 0 to 40, preferred 15 to 20 percent, of an organic polyol polymer having a hydroxyl number of about 50 to 200 and a weight average molecular weight of about 1,000 to 20,000, wherein the acrylic polymer comprises polymerized monomers selected from the group consisting of styrene; alkyl methacrylates and alkyl acrylates where the alkyl group has 1 to 12 carbon atoms; cycloaliphatic acrylates; cycloaliphatic methacrylates; aryl acrylates; aryl methacrylates; acrylamide; methacrylamide; acrylonitrile; methacrylonitrile; hydroxyalkyl acrylates and hydroxyalkyl methacrylates where the alkyl group has 1 to 4 carbon atoms; and mixtures thereof;

V) from 0 to 50, preferred 15 to 20 percent, of a silane functional polymer which is the reaction product of about 5 to 70 percent by weight of ethylenically unsaturated silane-containing monomers selected from the group consisting of alkoxysilane monomers, acyloxysilane monomers, and mixtures thereof, with about 30 to 95 percent by weight of ethylenically unsaturated non-silane containing monomers selected from the group consisting of styrene; alkyl acrylate and alkyl methacrylate where the alkyl groups have 1 to 12 carbon atoms; cycloaliphatic acrylates; cycloaliphatic methacrylates; aryl acrylates; aryl methacrylates; acrylamide; methacrylamide; acrylonitrile; methacrylonitrile; hydroxyalkyl acrylates and hydroxyalkyl methacrylates where the alkyl group has 1 to 4 carbon atoms; and mixtures thereof;

VI) from 0 to 50 percent of the reaction product of a polyol of the formula

with an alkoxysilane of the formula

wherein:

$R^1$ is selected from the group consisting of a) $C_2$ to $C_{20}$ alkyl; cycloaliphatic of aromatic rings, each optionally substituted with at least one member selected from the group consisting of O, N, P and S;

b) two or more cycloaliphatic or aromatic rings connected to each other through a covalent bond, or through an alkylene group of 1 to 5 carbon atoms, or through a heteroatom, or fused together to share two or more carbon atoms, each optionally substituted with a member selected from the group consisting of O, N, P and S; and c) linear polyester, branched polyester, linear and branched polyester, polyacrylate, polyolefin, polyether, polycarbonate, polyurethane, or polyamide, each such group having a weight average molecular weight between about 300 and 10,000, preferred less than 3,000;

$R^2$ is selected from the group consisting of a) $C_1$ to $C_{20}$ alkyl, cycloaliphatic or aromatic rings, each optionally substituted with a member selected from the group consisting of O, N, P and S; and b) two or more cycloaliphatic or aromatic rings connected to each other through a covalent bond, or through an alkylene group of 1 to 5 carbon atoms, or through a heteroatom, or fused together to share two or more carbon atoms, each optionally substituted with a member selected from the group consisting of O, N, P and S;

$R^3$ is selected from the group consisting of a) $C_2$ to $C_{20}$ alkyl, cycloaliphatic or aromatic rings, each optionally substituted with a member selected from the group consisting of O, N, P and S;

b) two or more cycloaliphatic or aromatic rings, each connected to each other through a covalent bond, or through an alkylene group of 1 to 5 carbon atoms, or through a heteroatom, or fused together to share two or more carbon atoms, each optionally substituted with a member selected from the group consisting of O, N, P and S; and c) linear polyester, branched polyester, linear and branched polyester, polyacrylate, polyolefin, polyether, polycarbonate, polyurethane or polyamide each such group having a weight average molecular weight between about 300 and 10,000, preferred less than 3,000;

$R^4$ is selected from the group consisting of alkyl of 1 to 12 carbon atoms, alkoxy containing 1 to 4 carbon atoms;

$R^5$ is selected from the group consisting of alkyl of 1 to 12 carbon atoms;

X is independently selected from the group consisting of alkoxy containing 1 to 20 carbon atoms, acyloxy containing 1 to 20 carbon atoms, phenoxy, halogen, amine, amide, urea, imidazole, carbamate, ketoximine, and oxazolidinone;

Y is selected from the group consisting of alkyl of 1 to 12 carbon atoms, alkoxy containing 1 to 20 carbon atoms, acyloxy containing 1 to 20 carbon atoms, phenoxy, halogen, amine, amide, urea, imidazole, carbamate, and oxazolidinone;

m is a positive integer of 2 or higher, preferred 2 to 30;
n is a positive integer of 1 or higher, preferred 1 to 3;
p is a positive integer of 2 or higher, preferred 2 to 30; and
t is a positive integer of 1 to 8;

wherein I≠VI and 5 to 75 percent by weight of the composition is one or both of components I and VI. Preferred compositions comprise 20 to 60 percent of I and/or VI and about 10 to 30 percent of V, most preferably 20 percent of V.

The compositions of this invention are oligomer-based and thus have a low volatile organic content (VOC). Characteristics of the compositions include hydroxy-containing, multifunctional structured polyester oligomers containing aliphatic and cycloaliphatic rings where the hydroxyls can be partly capped with silane functionality using a urethane linkage; structured oligomeric polymers containing silicate functionality; polymeric micro particles insoluble in the composition; and melamine crosslinker. This formulation provides improved scratch, mar and etch resistance. The silicates provide decreased viscosity which help lower VOC. In addition, the hydrogen bonding provided by the urethane linkages help maintain film integrity. The coatings are especially useful in automotive clearcoats.

DETAILS OF THE INVENTION

Component (I)

This is a representative reaction mechanism for preparing an exemplary Component I of the composition. Synthesis of the hybrid silane-silicate component:

alcohol or water; wherein said reaction product is homogeneous and contains residual moieties from the silicon-containing material which are directly bonded to Si and are easily displaceable by reaction with alcohol or water, and can also contain residual hydroxyl moieties from the organic polyol; said reaction product being self-curable to a continuous film by reaction of residual moieties from the organosilicon-containing material directly bonded to Si, with moisture and/or residual hydroxyl moieties from the organic polyol.

The silicon-containing substance required in the silicon-containing material is defined as follows. An organosilicon-containing substance useful in the invention is essentially free of alkali metal ions which distinguish it from generally known inorganic silicates such as alkali metal silicates including, for example, sodium orthosilicate.

Preferred organic polyol reactants for forming Component I are selected from (a) simple diols, triols, and higher hydroxyl alcohols, (b) polymer-based polyacrylate, polyester, polyether, polyamide, polyurethane, polycarbonate, polyhydrocarbon polyols, typically having a hydroxyl equivalent weight of about 30 to 1000, preferably from 50 to 500.

The simple diols, triols, and higher hydroxyl alcohols are generally known, examples of which include 2,3-dimethyl-2,3-butanediol (pinacol), 2,2-dimethyl-1-1,3-propanediol (neopentyl glycol), 2-ethyl-2-methyl-1,3-propanediol, 2,5-dimethyl-2,5-hexanediol, 1,4-butanediol, 1,6-hexanediol, 1,8-octanediol, 1,10-decanediol, 1,12-dodecanediol, 1,4-cyclohexanediol, 1,4-cyclohexanedimethanol, 4,4'-isopropylidenedicyclohexanol, 4,8-bis(hydroxyethyl)tricyclo[5.2.1.0]decane, 1,3,5-tris(hydroxyethyl)cyanuric acid (theic acid), 1,1,1-tris(hydroxymethyl)ethane, glycerol, pentaerythritol, sorbitol, sucrose and the like.

Linear and branched polyacrylic polyols include but are not limited to the polymers comprising polymerized monomers selected from the group consisting of styrene; alpha-

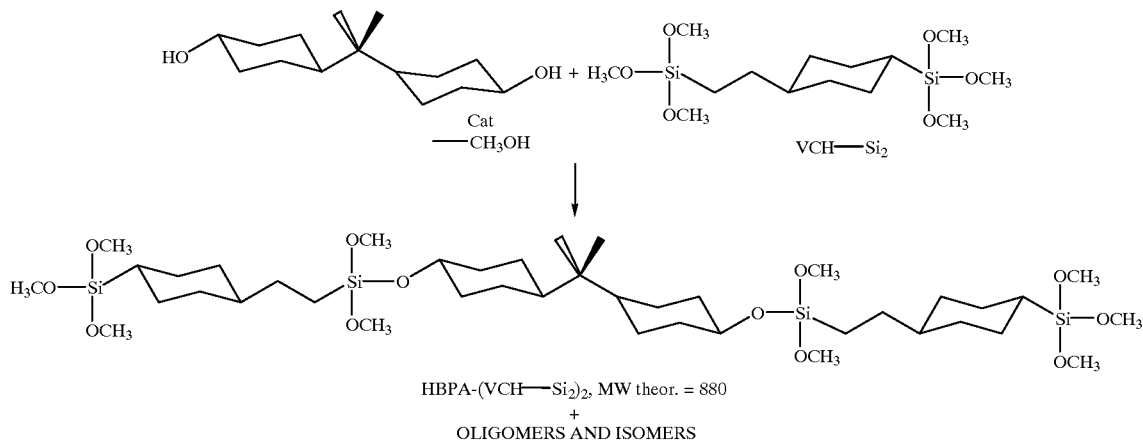

Preferred representatives of Component I are selected from the group consisting of the reaction product of at least one organic polyol; and a silicon-containing material comprising at least one silicon-containing substance essentially free of alkali metal ions, having atoms bonded directly to Si, all of said atoms being independently selected from the group consisting of C, O, N and halogen, said silicon-containing substance having moieties directly bonded to Si of which at least two are easily displaceable by reaction with methylstyrene; alkyl methacrylates; alkyl acrylates where the alkyl group has 1 to 12 carbon atoms; cycloaliphatic acrylates; cycloaliphatic methacrylates; aryl acrylates, aryl methacrylates; acrylamide; methacrylamide; acrylonitrile; methacrylonitrile; hydroxyalkyl acrylates and hydroxyalkyl methacrylate where the alkyl group has 1 to 4 carbon atoms; and mixtures thereof. Throughout this disclosure, "alkyl groups" include cyclic alkyl groups within that term.

Linear and branched polyester polyols useful in the preparation of I are known and prepared by conventional methods using simple diols, triols, and higher hydroxyl alcohols known in the art, including but not limited to the previously described simple diols, triols and higher hydroxyl alcohols with polycarboxylic acids. Examples of suitable polycarboxylic acids include but are not limited to hexahydro-4-methylphthalic acid; tetrahydrophthalic acid; phthalic acid; isophthalic acid; terephthalic acid; trimellitic acid; adipic acid; azelaic acid; sebasic acid; succinic acid; maleic acid; glutaric acid; malonic acid; pimelic acid; suberic acid; fumaric acid; itaconic acid; and the like. Anhydrides of the above acids, where they exist can also be employed and are encompassed by the term "polycarboxylic acids". In addition, multifunctional monomers which contain both hydroxyl and carboxyl functionalities, or their derivatives are also useful. Such monomers include but are not limited to lactones such as caprolactone; butyrolactone; valerolactone; propiolactone, and hydroxyacids such as hydroxy caproic acid; dimethylolpropionic acid and the like.

Preferred linear and branched polyester polyols are prepared using simple diols, triols, and higher hydroxyl alcohols known in the art including but not limited to the previously described simple diols, triols and higher hydroxyl alcohols with anhydrides known in the art including but not limited to the previously described anhydrides such as hexahydromethylphthalic anhydride giving the corresponding polycarboxylic acids, which are then reacted with alkylene oxides, preferably with the glycidyl esters of organic acids such as commercial Cardura-E®. By this method, the resulting polyester polyol can predominantly contain secondary hydroxyl groups.

Linear and branched polyether polyols useful in the preparation of I are known and prepared by conventional methods, typically by the ring-opening polymerization of cyclic ethers and/or acetals known in the art including but not limited to epoxides, oxetanes, furanes and higher cyclic ethers, optionally also using simple diols, triols, and higher hydroxyl alcohols known in the art including but not limited to the previously described simple diols, triols and higher hydroxyl alcohols in order to introduce the hydroxyl end groups and to control polymer molecular weight and topology. Examples of polyether polyols include the generally known poly(tetramethylene oxide) diols, e.g., commercial Terathane®, prepared by polymerization of tetrahydrofuran in the presence of cationic catalysts. The useful polyether polyols also include the poly(propylene oxide) diols prepared by cationic or anionic polymerization or copolymerization of propylene oxide. The simple diols, triols, and higher hydroxyl alcohols can be used as initiators/telogens to make controlled linear and branched structures.

Linear and branched amide-containing polyols are known and prepared by analogous processes described for preparation of the polyester polyols from any of the above described diacids and diols and/or higher hydroxyl alcohols or lactones, but using in addition certain amount of diamines and/or higher amines and/or aminoalcohols.

Linear and branched polycarbonate polyols useful in the preparation of I are known and prepared by conventional methods using simple diols, triols, and higher hydroxyl alcohols including but not limited to the previously described simple diols, triols, and higher hydroxyl alcohols with carbonates. Aliphatic polycarbonate polyols can also be prepared from 1,3-dioxan-2-ones. Conventional methods for the preparation of the aliphatic polycarbonate polyols include transesterification of simple diols, triols, and higher hydroxyl alcohols with lower dialkyl carbonates, dioxolanones, or diphenyl carbonate in the presence of catalysts such as alkali metal, tin, and titanium compounds.

Linear and branched polyurethane polyols useful in the preparation of I are known and prepared by conventional methods using simple diols, triols, and higher hydroxyl alcohols including but not limited to the previously described simple diols, triols, and higher hydroxyl alcohols, polyester polyols, amide-containing polyols, polycarbonate polyols, polyhydrocarbone polyols with organic polyisocyanates. The organic polyisocyanate can be reacted with the polyol either directly to form the polyurethane polyol or by the prepolymer method wherein the polyol and polyisocyanate are reacted in relative proportion to first produce an isocyanate-terminated prepolymer with subsequent reaction of the prepolymer with the same or different additional polyol to form the polyurethane polyol. The polyisocyanate which is reacted with the polyol can be any organic polyisocyanate. The polyisocyanate can be aromatic, aliphatic, cycloaliphatic, or heterocyclic and can be substituted or unsubstituted. Many such organic polyisocyanates are known, examples of which include: toluene diisocyanate isomers, diphenylmethane diisocyanate isomers, biphenyl diisocyanate, tetramethylene-1,4-diisocyanate, hexamethylene-1,6-diisocyanate, isophorone diisocyanate, cyclohexane diisocyanate isomers, hexahydrotoluene diisocyanate isomers and mixtures thereof.

Polyhydrocarbone polyols useful in the preparation of I are known and prepared by conventional methods using olefins such as isoprene, butadiene, styrene usually polymerized in the presence of multifunctional anionic initiators, followed by hydroxylation with epoxides or in the presence of multifunctional cationic initiators for monomers like isobutylene, styrene followed by hydroxylation of olefin terminal groups. Many such polyhydrocarbone polyols are known and commercially available, an example of which is Shell's Kraton Liquid® Polymers.

Preferred silicon-containing reactants for forming I are selected from at least one silicon-containing substance essentially free of alkali metal ions, having atoms bonded directly to Si, all said atoms being selected from the group consisting of C, O, N, and/or halogen, said silicon-containing substance having at least two moieties directly bonded to Si which are easily displaceable by reaction with water and/or alcohol. Examples of moieties directly bonded to Si which are displaceable by reaction with alcohol or water include but are not limited to —OR (alkoxy, aryloxy), —O(O)CR (acyloxy), —NH(O)CR (amide), —NH(O)COR (carbamate), —NH(O)CNHR (urea), —ON=CR$^2$ (ketoximine), —NR$^2$ (amine), —X (halogen).

The preferred silicon-containing reactants useful in preparing I are selected from (a) simple monosilanes, $R^2$—SiYX$_2$, (b) multisilanes, $R^2$—(SiYX$_2$)$_n$ containing at least two reactive silane groups preferably two or three having a silicon equivalent weight of about 30 to 600, preferably from 50 to 400.

The simple monosilanes $R^2$—SiYX$_2$ include structures where $R^2$ is selected from the group consisting of $C_1$ to $C_{20}$ linear or branched alkyl, cycloaliphatic or aromatic rings, each optionally substituted with a member selected from the group consisting of O, N, P and S; alkoxy containing 1 to 20 carbon atoms, acyloxy containing 1 to 20 carbon atoms, phenoxy, halogen, amine, amide, urea, imidazole, carbamate, ketoximine and oxazolidinone; X is selected from the group consisting of alkoxy containing 1 to 20 carbon atoms, acyloxy containing 1 to 20 carbon atoms, phenoxy, halogen, amine, amide, urea, imidazole, carbamate, ketoximine and oxazolidinone; Y is selected from the group consisting of alkyl of 1 to 12 carbon atoms, alkoxy containing 1 to 20 carbon atoms, acyloxy containing 1 to 20 carbon atoms, phenoxy, halogen, amine, amide, urea, imidazole, carbamate, ketoximine and oxazolidinone. Examples of the monosilanes include but are not limited to the following alkoxysilanes: tetramethoxysilane, tetraethoxysilane, teterapropoxysilane, methyltrimethoxysilane, methyltriethoxysilane, methyltripropoxysilane, ethyltrimethoxysilane, ethyltriethoxysilane, ethyltripropoxysilane, propyltrimethoxysilane, propyltriethoxysilane, propyltripropoxysilane, isobutyltrimethoxysilane, isobutyltriethoxysilane, isobutyltripropxysilane, octyltrimethoxysilane, octyltriethoxysilane, octyltripropoxysilane, isooctyltrimethoxysilane, isooctyltriethoxysilane, isooctyltripropoxysilane, vinyltrimethoxysilane, vinyltriethoxysilane, vinyltripropoxysilane, phenyltrimethoxysilane, phenyltriethoxysilane, phenyltripropoxysilane.

Examples of silicon-containing reactants other than the above alkoxysilanes include the analogous silanes in which the alkoxysilane groups are replaced by the following groups which are also displaceable by reaction with alcohol or water: acetoxy, phenoxy, chloro, methylethylketoximine, acetamide, carbamate, amine, imidazole, urea, and oxazolidinone.

Multisilanes $R^2$—$(SiYX_2)_n$ containing at least two reactive silane groups are known and typically prepared by methods based on the hydrosilylation of dienes, trienes or higher polyolefins with the corresponding hydrosilanes. The hydrosilylation can be accomplished either using free-radical initiators or various other catalysts, including transition metals. The multifunctional silanes $R^2$—$(SiYX_2)_n$ include structures where $R^2$ is selected from the group consisting of $C_2$ to $C_{20}$ linear branched alkyl, cycloaliphatic or aromatic rings, each optionally substituted with a member selected from the group consisting of O, N, P and S; two or more cycloaliphatic or aromatic rings, connected to each other through a covalent bond, or through an alkylene group of 1 to 5 carbon atoms, each optionally substituted with a member selected from the group consisting of O, N, P, and S; alkoxy containing 1 to 20 carbon atoms, acyloxy containing 1 to 20 carbon atoms, phenoxy, halogen, amine, amide, urea, imidazole, carbamate, ketoximine and oxazolidinone; X is selected from the group consisting of alkoxy containing 1 to 20 carbon atoms, acyloxy containing 1 to 20 carbon atoms, phenoxy, halogen, amine, amide, urea, imidazole, carbamate, ketoximine and oxazolidinone; Y is selected from the group consisting of alkyl of 1 to 12 carbon atoms, alkoxy containing 1 to 20 carbon atoms, acyloxy containing 1 to 20 carbon atoms, phenoxy, halogen, amine, amide, urea, imidazole, carbamate, ketoximine and oxazolidinone.

Examples of multifunctional silanes include but are not limited to 1,2-bis(trimethoxysilyl)ethane, 1,6-bis(trimethoxysilyl)hexane, 1,8-bis(trimethoxysilyl)octane, 1,4-bis(trimethoxysilylethyl)benzene, bis(3-trimethoxysilylpropyl)amine, bis(3-trimethoxysilylpropyl)ethylenediamine, bis(trimethoxysilyl) derivatives of the following polyolefins: limonene and other terpines, 4-vinyl-1-cyclohexene, 5-vinyl-2-norbornene, norbornadiene, dicyclopentadiene, 1,5,9-cyclododecatriene, tris(trimethoxysilyl) derivatives of higher polyolefins such as 1,2,4-trivinylcyclohexane and the like. Examples of the substituted multifunctional silanes include but are not limited to bis and tris(trimethoxysilane) derivatives of polyunsaturated polyesters of the corresponding acids: trimellitic acid, cyclohexane dicarboxylic acids, 10-undecenoic acid, vinylacetic acid; and bis and tris(trimethoxysilane) derivatives of polyunsaturated polyethers of the corresponding polyols: 1,4-cyclohexanedimethanol, 4,4'-isopropylidenedicyclohexanol.

The reactive monosilanes and multisilanes usually contain variable levels of their corresponding hydrolysis and condensation products from the reaction with water which can be added purposely or adventitiously introduced from ambient moisture or with other components, particularly polyols. The hydrolysis/condensation processes introduce the stable —Si—O—Si— linkages, and increase silane average molecular weight, functionality and product I viscosity.

Optionally, the reactive silanes $R^2$—$(SiYX_2)_n$ can contain an organofunctional group attached to Si not directly but through $R^2$. Examples of functional groups include amino, epoxy, mercapto, isocyanate, ureido, phosphate, olefin (vinyl, allyl, acrylate) and the like. The organofunctional silanes are known, examples of which include but are not limited to 3-aminopropyltrimethoxysilane, 3-glycidoxypropyltrimethoxysilane, 3-mercaptopropyltrimethoxysilane, 3-isocyanopropyltrimethoxysilane, 3-ureidopropyltrimethoxysilane, diethylphosphatoethyltriethoxysilane, vinyltrimethoxysilane, allyltrimethoxysilane, 3-methacryloxypropyltrimethoxysilane and the corresponding analogs of the above where the trimethoxysilane group is replaced by various combinations of methyldialkoxysilane groups as defined by —$SiYX_2$. Although the incorporation of some organofunctional silanes can be desirable for some properties, their level should be minimized or avoided because the organofunctional silanes are significantly more expensive than non-organofunctional silanes.

An objective of this invention is to replace organosilanes (Si—C) by silyl ethers (SiO—C). The organofunctional silanes have reactive silane groups attached through a very hydrolytically stable Si—C bond, but they are more expensive and structurally limited, due to the demanding nature of the direct and hydrosilylation synthetic processes. In contrast, the silyl ethers have a less hydrolytically stable C—O—Si linkage, but are less expensive and available in many variations through a convenient exchange process involving polyol hydroxyl group and the silane exchangeable groups. Furthermore, the C—O—Si stability can be dramatically increased by a few orders of magnitude via steric and hydrophobic factors, which are virtually unexplored in heterogeneous polymeric systems. Another objective of this invention is to develop stable unconventional polymeric silyl ethers with good chemical stability.

The silylation of the polyol $R^1$—$(OH)_m$ with $R^2$—$(SiYX_2)_n$ resulting in the C—O—Si formation is usually an equilibrium process, which can be controlled, e.g., shifted toward the desired $R^1$—C—O—Si—$R^2$, by using an excess of a silane and/or removing a volatile X—H by-product. The reaction can be carried out with or without a catalyst primarily depending on the reactivity of the SiX. It is desired for storage stability, particularly moisture stability, to prepare a product essentially free of catalyst. Therefore, catalysts which can be effectively and conveniently removed from the products are preferred for the silylation. Particularly useful are heterogeneous catalysts such as fluorosulfonic acid (Nafion® NR-50; DuPont), which can be easily separated from the product. Other preferred catalysts are volatile catalysts such as trifluoroacetic acid, amines or thermofugitive catalysts such a tetraalkylammonium hydroxides, which can be substantially removed by a postheating. Many other useful catalysts can be employed and removed by passing the product through appropriate ion exchange or absorbing media. Examples of other useful catalysts include but are not limited to medium and strong acids or bases such as sulfonic acids, alkali bases; ammonium salts; tin containing compounds such as dibutyltin dilaurate, dibutyltin diacetate, dibutyltin dioctate, dibutyltin dioxide; titanates such as tetraisopropyl titanate, tetrabutyl titanate (DuPont Tyzor®), aluminum titanate, aluminum chelates, zirconium chelate and the like.

Typically, the silylation reaction is conducted in a substantially moisture-free atmosphere, usually under a blanket of an inert dry gas such as nitrogen. The polyol $R^1$—$(OH)_m$ and the silane $R^2$—$(SiYX_2)_n$, optionally with a catalyst, are heated for several hours at temperatures ranging from 60° to 200° C. with the distillation and removal of the low boiling, volatile reaction by-product such as an alcohol (typically methanol). The reaction progress is controlled by monitoring the amount of the by-product alcohol collected, reaction mixture viscosity changes, optionally substrate conversion and product formation by GC, MS and NMR. To minimize color in product, conventional methods can be employed such as anticolor additives containing active P—H groups or filtration through active carbon, silicon or other standard decolorizing media. The synthesis can be carried out without solvent or with a little of any aprotic solvents because the replacement of the H-bonded hydroxyl groups in the starting polyols by low polarity silyl groups results in a dramatic viscosity reduction of two to three orders of magnitude. This is a highly desired feature allowing significant volatile organic component (VOC) reduction. Typically, the silylated polyols useful for high solids coatings have viscosity in the range of 1 to 10,000 centipoise.

The silylation of $R^1$—$(OH)m$ with $R^2$—$(SiYX_2)_n$ usually gives a complex mixture composed of various oligomers and isomers as indicated by MS analysis. This is due to the statistical nature of the silylation involving multifunctional substrates and a contribution of the silane hydrolysis/condensation processes from usually adventitious water. An attractive property balance such as scratch, mar, chemical etch resistance, and appearance is often provided by a narrow operational window of a special product mixture composition. The oligomer composition can be varied widely by the substrate ratio and the extent of the oligomerization as controlled by catalyst choice, time and temperature shown in the Procedures presented hereafter.

The silylated polyols I are storage stable. To enhance the storage stability, it is recommended to prevent the introduction of moisture by storing in airtight containers, under dry inert gas such as nitrogen. It is desired for stability to have a product essentially free of any catalyst; optionally to add conventional moisture scavengers such as orthoformates, orthoacetates or certain alcohols.

Component (II)

The dispersed polymer employed in the compositions of the present invention are characterized as polymer particles dispersed in an organic media, which particles are stabilized by what is known as steric stabilization. In the dispersed polymers, the dispersed phase or particle, sheathed by a steric barrier, will be referred to as the "macromolecular polymer" or "backbone." The stabilizer forming the steric barrier attached to this backbone, will be referred to as the "macromonomer chains" or "arms."

The dispersed polymers solve the problem of cracking heretofore associated with silane coatings. These dispersed polymers, to reduce cracking to the desired minimum, must be used in higher amounts than dispersed polymers are typically used for other purposes. For example, while microgels have been used in basecoats for flow control at levels of not more than about 5%, the present dispersed polymers are used in an amount varying from about 10 to 60% by weight, preferably about 15 to 40%, more preferably about 20 to 30%, of the total solids binder in the composition. The ratio of the silane polymer component of the composition suitably ranges from 5:1 to 1:2, preferably 4:1 to 1:1. These relatively high concentrations of dispersed polymers, are made possible by the presence of reactive groups on the arms of the dispersed polymer, which reactive groups make the polymers compatible with the continuous phase of the system.

The dispersed polymer contains about 10–90% by weight, preferably 50–80%, based on the weight of the dispersed polymer, of a high molecular weight backbone having a weight average molecular weight of about 50,000–500,000. The preferred average particle size is 0.1 to 0.5 microns. The arms, attached to the backbone, make up about 10–90% by weight, preferably 20–50%, of the dispersed polymer, and have a weight average molecular weight of about 1,000–30,000, preferably 1,000–10,000.

Preferably, the macromolecular backbone of the dispersed polymer is comprised of polymerized ethylenically unsaturated monomers. Suitable monomers include styrene, alkyl acrylate or methacrylate, ethylenically unsaturated monocarboxylic acid, and/or silane containing monomers. Such monomers as methyl methacrylate contribute to a high Tg (glass transition temperature) dispersed polymer, whereas such "softening" monomers as butyl acrylate or 2-ethylhexylacrylate contribute to a low Tg dispersed polymer. Other optional monomers are hydroxyalkyl acrylates or methacrylates or acrylonitrile. It is noted that such functional groups as hydroxy can react with silane groups in the organosilane polymer to produce more bonding in the composition. If the backbone is crosslinked, allyl acrylate or methacrylate, which crosslink with each other, can be used or an epoxy functional monomer such as glycidyl acrylate or methacrylate can be used, which can react with a monocarboxylic acid functional ethylenically unsaturated monomer to crosslink the backbone.

There can be silane functionality for crosslinking purposes, in the backbone, which functionality can be provided by a small amount of one or more of the silane-containing monomers mentioned above with respect to the film forming organosilane polymer. About 2 to 10%, preferably less than 5%, of the monomers making up the macromolecular backbone are silane monomers capable of crosslinking between themselves. Thus, crosslinking occurs by siloxane bonding (—Si—O—Si—). This silane crosslinking enables the backbone to behave as a non-crosslinked polymer before cure for good flow during application, resulting in improved appearance. The backbone can crosslink during and after curing, upon exposure to humidity and heat during curing and/or exposure to humidity in the environment after curing. A further advantage of silane being present in the backbone is that the cured film does not blush when exposed to humidity, which blushing was found to occur without the presence of silane. If the core is pre-crosslinked (before curing) by other means, such as acid/epoxy or diacrylates, then humidity sensitivity can be eliminated but the system may have poor flow and appearance.

A distinctive feature of the dispersed polymers is the presence of macromonomer arms which are reactive, that is these arms have numerous reactive groups, referred to a "crosslinking functionalities," which are adapted to react with the organosilane polymer of the present composition. A substantial portion of these functionalities in the arms, preferably the majority thereof, react and crosslink with the film-former of the composition, which can exclusively consist of an organosilane polymer. Of course, if additional film-forming polymers are present, for exarnple, a polyol, then the arms can react with film-formers other than the organosilane polymer. Suitably, about 3 to 30% of the monomers which make up the macromonomer arms have reactive crosslinking functional groups. Preferably, about 10 to 20% of the monomers have such reactive groups.

The arms of the dispersed polymer, should be anchored securely to the macromolecular backbone. For this reason, the arms are typically anchored by covalent bonds. The anchoring must be sufficient to hold the arms to the dispersed polymer after they react with the film-former polymer. The arms suitably comprise about 5 to 30% by weight, preferably 10 to 20%, based on the weight of macromonomer, of polymerized ethylenically unsaturated hydroxy, epoxide, silane, acid, anhydride, isocyanate, amine, or other crosslinking functionality containing monomers, or combinations thereof, and about 70–95% by weight, based on the weight of the macromonomer, of at least one other polymerized ethylenically unsaturated monomer without such crosslinking functionality. Preferably, the crosslinking functionality is a hydroxy, silane or epoxy containing monomer, since such reactive groups can be utilized in one package systems. When the crosslinking functionality is an acid, anhydride, or isocyanate, then a two package system, with the dispersed polymer in a first package and the organosilane in a second package, is generally required. Combinations of the above-mentioned crosslinking functional groups are also suitable, although it is noted that hydroxy and silane groups have limited compatibility and are preferably not on the same macromonomer chain.

As an example, the macromonomer arms attached to the backbone can contain polymerized monomers of alkyl methacrylate, alkyl acrylate, each having 1–12 carbon atoms in the alkyl group, as well as glycidyl acrylate or glycidyl methacrylate or ethylenically unsaturated monocarboxylic acid containing monomers for anchoring and/or crosslinking. Typically useful hydroxy containing monomers are hydroxy alkyl acrylates or methacrylates as described above. One skilled in the art will know how to prepare Component II.

Component III

Representative of the melamine component useful in the composition(s) of this invention are monomeric or polymeric alkylated melamine formaldehyde resins that are partially or fully alkylated. One preferred crosslinking agent is a methylated and butylated or is butylated melamine formaldehyde resin that has a degree of polymerization of about 1–3. Generally, this melamine formaldehyde resin contains about 50% butylated groups or isobutylated groups and 50% methylated groups. Such crosslinking agents typically have a number average molecular weight of about 500–1500. Examples of commercially available resins are "Cymel" 1168, "Cymel" 1161, "Cymel" 1158, "Resimine" 4514 and "Resimine" 354. Preferably, the crosslinking agent is used in the amount of about 5–50% by weight, based on the weight of the binder of the composition. Other crosslinking agents are alkylated urea formaldehyde, alkylated benzoguanamine formaldehyde and blocked isocyanates.

Component IV

Representative organic polyol film-formers useful in the compositions of this invention include acrylics, cellulosics, urethanes, polyesters, epoxides or mixtures thereof. One preferred optional film-forming polymer is a polyol, for example an acrylic polyol solution polymer of polymerized monomers. Such monomers may include any of the aforementioned alkyl acrylates and/or methacrylates and, in addition, hydroxy alkyl acrylates or methacrylates. The polyol polymer preferably has a hydroxyl number of about 50–200 and a weight average molecular weight of about 1,000–200,000 and preferably about 1,000–20,000.

To provide the hydroxy functionality in the polyol, up to about 90% by weight, preferably 20 to 50%, of the polyol comprises hydroxy-functional polymerized monomers. Suitable monomers include hydroxyalkyl acrylates and methacrylates, for example, hydroxyethyl acrylate, hydroxypropyl acrylate, hydroxyisopropyl acrylate, hydroxybutyl acrylate, hydroxyethyl methacrylate, hydroxypropyl methacrylate, hydroxyisopropyl methacrylate, hydroxybutyl methacrylate and the like, and mixtures thereof.

Other polymerizable non-hydroxy containing monomers can be included in the polyol polymer, in an amount up to about 90% by weight, preferably 50 to 80%. Such polymerizable monomers include, for example, styrene, methylstyrene, acrylamide, acrylonitrile, methacrylonitrile, methacrylamide, methylol methacrylamide, methylol acrylamide, and the like, and mixtures thereof.

One example of an acrylic polyol polymer comprises about 10–20% by weight of styrene, 40–60% by weight of alkyl methacrylate or acrylate having 1–8 carbon atoms in the alkyl group, and 10–50% by weight of hydroxy alkyl acrylate or methacrylate having 1–4 carbon atoms in the alkyl group. One such polymer contains about 15% by weight styrene, about 29% by weight isobutyl methacrylate, about 20% by weight of 2-ethylhexyl acrylate, and about 36% by weight of hydroxypropyl acrylate.

Component V

Contemplated silane-functional polymers include reaction products comprising ethylenically unsaturated non-silane containing monomers and ethylenically unsaturated silane-containing monomers. Suitable ethylenically unsaturated non-silane containing monomers are alkyl acrylates, alkyl methacrylates and any mixtures thereof, where the alkyl groups have 1–12 carbon atoms, preferably 1–8 carbon atoms.

Suitable alkyl methacrylate monomers used to form the organosilane polymer are methyl methacrylate, ethyl methacrylate, propyl methacrylate, butyl methacrylate, isobutyl methacrylate, pentyl methacrylate, hexyl methacrylate, octyl methacrylate, nonyl methacrylate, lauryl methacrylate and the like. Similarly, suitable alkyl acrylate monomers include methyl acrylate, ethyl acrylate, propyl acrylate, butyl acrylate, isobutyl acrylate, pentyl acrylate, hexyl acrylate, octyl acrylate, nonyl acrylate, lauryl acrylate and the like. Cycloaliphatic methacrylates and acrylates also can be used, such as trimethylcyclohexyl methacrylate, trimethylcyclohexyl acrylate, isobutylcyclohexyl methacrylate, t-butylcyclohexyl acrylate, t-butylcyclohexyl methacrylate, cyclohexyl methacrylate, cyclohexyl acrylate, isobornyl methacrylate, and isobornyl acrylate. Aryl acrylate and aryl methacrylates also can be used, such as benzyl acrylate and benzyl methacrylate, and mixtures of two or more of the above mentioned monomers are also suitable.

In addition to alkyl acrylates or methacrylates, other non-silane containing polymerizable monomers, up to about 50% by weight of the polymer, can be used in the acrylosilane polymer for the purpose of achieving the desired properties such as hardness, appearance, mar resistance, and the like. Exemplary of such other monomers are styrene, methyl styrene, acrylamide, acrylonitrile, methacrylonitrile, and the like. Styrene can be used in the range of 0–50% by weight.

A suitable silane containing monomer useful in forming the acrylosilane polymer is an alkoxysilane having the following structural formula:

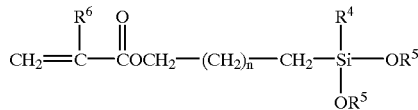

wherein $R^4$ and $R^5$ are as described above; and are independently either H, $CH_3$, $CH_3CH_2$, and n is 0 or a positive integer from 1 to 10. $R^6$ is selected from H and $C_1$ to $C_{12}$ alkyl. Preferably, $R^4$ is $CH_3$, $CH_3O$ or $CH_3CH_2O$, $R^6$ is methyl, and n is 1.

Typical alkoxysilanes are the acrylatoalkoxy silanes, such as gamma-acryloxypropyl-trimethoxy silane and the methacrylatoalkoxy silanes, such as gamma-methacryloxypropyltrimethoxy silane, and gamma-methacryloxypropyltris(2-methoxyethoxy)silane.

Other suitable alkoxy silane monomers have the following structural formula:

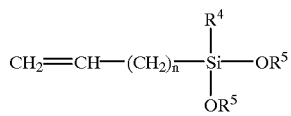

wherein $R^4$ and $R^5$ are described above and n is 0 or a positive integer from 1 to 10.

Examples of such alkoxysilanes are the vinylalkoxy silanes, such as vinyltrimethoxy silane, vinyltriethoxy silane and vinyltris(2-methoxyethoxy)silane, allyltrimethoxysilane and allyltriethoxysilane.

Other suitable silane containing monomers are ethylenically unsaturated acryloxysilanes, including acrylatoxysilane, methacrylatoxysilane and vinylacetoxysilanes, such as vinylmethyldiacetoxysilane, acrylatopropyltriacetoxysilane, and methacrylatopropyltriacetoxysilane. Of course, mixtures of the above-mentioned silane-containing monomers are also suitable.

Silane functional macromonomers also can be used in forming the silane polymer. These macromonomers are the reaction product of a silane containing compound, having a reactive group such as epoxide, amine or isocyanate, with an ethylenically unsaturated non-silane containing monomer having a reactive group, typically a hydroxyl or an epoxide group, that is co-reactive with the silane monomer. An example of a useful macromonomer is the reaction product of a hydroxy-functional ethylenically unsaturated monomer such as a hydroxyalkyl acrylate or methacrylate having 1–4 carbon atoms in the alkyl group and an isocyanatoalkylalkoxysilane such as isocyanatopropyltrimethoxysilane.

Typical of silane-functional macromonomers are those having the following structural formula:

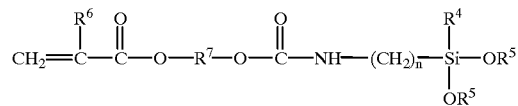

wherein $R^4$, $R^5$, and $R^6$ are as described above; $R^7$ is alkylene of 1 to 8 carbons and n is a positive integer from 1 to 8.

Component VI

Preferred representatives of Component VI are selected from the group consisting of the reaction product of an isocyanoalkylalkoxysilane with one or more organic polyols $R^3$—$(OH)_p$ described above for use in the preparation of I, or selected from the group $R^1$—$(OH)_m$ described above for use in the preparation of Component VI.

Other Ingredients

A catalyst is typically added to catalyze the crosslinking of the silane moieties of the silane polymer with itself and with other components of the composition, including the dispersed polymer. Typical of such catalysts are dibutyl tin dilaurate, dibutyl tin diacetate, dibutyl tin dioxide, dibutyl tin dioctoate, tin acetate, titanates such as tetraisopropyl titanate, tetrabutyl titanate (DuPont Tyzor®), aluminum titanate, aluminum chelates, zirconium chelate and the like.

Amines and acids or combinations thereof are also useful for catalyzing silane bonding. Preferably, these catalysts are used in the amount of about 0.1 to 5.0% by weight of the composition.

In addition, the coating composition can include a structured polymer and/or a star polymer.

To improve weatherability of a clear finish produced by the present coating composition, an ultraviolet light stabilizer or a combination of ultraviolet light stabilizers can be added in the amount of about 0.1–5% by weight, based on the weight of the binder. Such stabilizers include ultraviolet light absorbers, screeners, quenchers, and specific hindered amine light stabilizers. Also, an antioxidant can be added, in the about 0.1–5% by weight, based on the weight of the binder.

Typical ultraviolet light stabilizers that are useful include benzophenones, triazoles, triazines, benzoates, hindered amines and mixtures thereof. The composition can also include other conventional formulation additives such as flow control agents, for example such as Resiflow® S (polybutylacrylate), BYK 320 and 325 (polyether-modified polysiloxanes); rheology control agents, such as fumed silica, and the like.

The coating composition of this invention based on Components I through VI is typically formulated as a one-package system by conventional methods, although two-package systems are also possible as will occur to one skilled in the art.

EXAMPLES AND PROCEDURES

Procedures.

Method for Making Silanated 4-vinyl-1-cyclohexene (Intermediate of I)

A 2-neck 100 ml round-bottom flask was equipped with a magnetic stirring bar, heating mantle, solids addition funnel, and condenser. The condenser was fitted with a Claisen adapter and a polytetrafluoroethylene-clad thermocouple was inserted through the Claisen adapter and condenser to reach the liquid layer of the flask. The other arm of the Claisen adapter was connected to a 50 ml liquid addition funnel fitted with a Dewar condenser. The entire assembly was purged with nitrogen prior to the reaction and a positive pressure of nitrogen was maintained during the reaction.

The round bottom flask was charged with 4-vinyl-1-cyclohexene (22 g, 0.20 mole). The solids addition funnel was charged with 3 g of Vazo® 64. The liquid addition funnel was charged with trichlorosilane (57 g, 0.42 mole). The condenser on the flask and the condenser on the solids addition funnel were cooled to −10° C. Stirring was started and the flask contents were heated. Once the flask temperature exceeded 90° C., enough trichlorosilane was added to bring the flask temperature to about 85° C. Small quantities of Vazo® 64 were added intermittently. The temperature was maintained between 85–95° C. by adding trichlorosilane and small amounts of initiator as needed.

Excess trichlorosilane in the reaction mixture was evaporated by passing nitrogen over the reaction mixture and recondensing trichlorosilane in the liquid addition funnel. At this point, the temperature was allowed to rise to 125° C., then held for 1 hour. The total reaction time was 15 hours. The reaction mixture was then cooled to ambient temperature and the product isolated by standard inert atmosphere techniques. After isolation GC analysis using an internal standard indicated that the vinylcyclohexene was consumed giving both monosubstituted product: 4-(2-trichlorosilylethyl)cyclohex-1-ene and isomers thereof and distributed product: 4-(2-trichlorosilylethyl)-1-trichlorosilylcyclohexane and isomers thereof. Bis(trimethoxysilylated) product (4-VCHSi$_2$) was obtained by a conventional methoxylation of the reaction mixture and isolated by a vacuum distillation.

Preparation of 4-VCH—Si$_2$/HBPA Silane/Silicate Hybrid Oligomers

In a five-liter flask equipped with a magnetic stirrer, Vigreux fractional distillation head under nitrogen blanket, were heated at 100–120° C., hydrogenated bisphenol A HBPA (700 g, 2.91 mole), 4-VCH—Si$_2$ (2400 g, 6.82 mole), Nafion® NR-50 (100 g), trifluoroacetic acid (TFAA, 5 g). In about 6 hours, the pot temperature increased from 105 to 119° C. and about 240 ml MeOH was collected. Crude product: viscosity 12 poise, color a=−1.3, b=+6.4. Optionally, the crude product was diluted with about 500 ml hexanes, filtered through a multilayer system composed of: a Whatman 50 filter paper; silica gel desiccant, grade 12; silica gel 60; and decolorizing carbon, Norit® 211. Volatiles were removed in 1 hour at 75° C. under vacuum (20 Torr) on a rotary-evaporator. Yield: 2700 g, viscosity 15 poise, Mn=1750, Mw/Mn=1.45 (by MALDI MS), color a=−0.79, b=+3.8.

Procedure for Making Acrylic Polyol

In a 5-liter nitrogen inerted flask equipped with 2 addition inlets charge 198 g of ethylene glycol monobutyl acetate and 198 g of aromatic hydrocarbon solvent (155° C. to 177° C. boiling range, e.g., Cyclosol® 100 from Shell Chemical Co.). Heat to reflux. Add the following two mixtures over an eight hour period; (1) 834.8 g of styrene, 973.9 g of hydroxypropyl acrylate, 556 g of isobutyl methacrylate, 417.4 g of butyl acrylate, 43.2 g of the above mentioned aromatic hydrocarbon solvent and 43.2 g of ethylene glycol monobutyl acetate. Dissolve in mineral spirits: (2) 107.3 g of ethylene glycol monobutyl acetate, 107.3 g of aromatic hydrocarbon solvent and 292.9 g of a 75 weight percent solution of t-butylperoxyacetate. Hold the mixture at reflux for 30 minutes after addition and then cool and empty.

Preparation of Acrylic Polyol Silicate

In a five-liter flask equipped with a magnetic stirrer, Vigreux fractional distillation head under nitrogen blanket were heated at 85–120° C. acrylic polyol (2000 g, 65 weight percent in aromatic spirit, copolymer containing 31 weight percent of styrene, 22 weight percent of cyclohexylmethacrylate, 8 weight percent of isobutylmethacrylate, 39 weight percent of hydroxypropylmethacrylate, 3.52 mole OH), methyltrimethoxylsilane (MTMOS, 1100 g, 8.08 mole), Nafion® NR-50 (137 g). In about 6 hours, the pot temperature increases from 95 to 120° C. and 154 ml of distillate containing mostly MeOH is collected. The Vigreux column is replaced by a short path distillation head and an excess of MTMOS is distilled off at a pot temperature up to 125° C. The crude product is diluted with about 500 ml of EtOAc, filtered through a multilayer system composed of a Whatman 50 filter paper; silica gel desiccant, grade 12; silica gel 60; decolorizing carbon, Norit 211. Volatiles are removed in 1 hour at 75° C. under vacuum (20 Torr) on a rotary-evaporator. Yield: 1837 g, viscosity >100 poise.

Procedure for Acrylosilane Resin

In a 5-liter, nitrogen inerted flask, charge 900 g of n-pentyl propionate. Heat to reflux. To the flask, add the following mixture over the course of six (6) hours: 1,896 g of styrene, 1164.8 g of gamma-methacryloxypropyltrimethoxy silane, 179.2 g of 2-ethylhexylmethacrylate, 170.2 g of Vazo® 67 (2,2'-azobis(2-methylbutanenitrile). Hold the mixture at reflux for 30 minutes. Then add 60 g of n-pentyl-propionate and 9 g of Vazo® 67 over a 30 minute period. Hold the mixture at reflux for 30 minutes and then cool to recover the product.

Synthesis of Cyclohexanedimethanol/Silane Adduct

Melt cyclohexanedimethanol in laboratory oven. When melted, take 294.7 g of cyclohexanedimethanol along with 0.11 g dibutyl tin dilaurate and place in a flask at about 35° C. Add 419.5 g of isocyanatopropyltrimethoxysilane over 75 minutes. Then hold for two hours. Cool and empty.

Stabilizer Package

A mixture of the following ingredients is used for the stabilization package:
xylene 67.5 grams,
2-(3',5'-bis(1-methyl-1-phenylethyl)-2'-hydroxyphenyl) benzotriazole, and ultraviolet absorber, Tinuvin® 900 purchased from Ciba Corporation/7.5 grams,
Hindered amine light stabilizer, Tinuvin® 123 purchased from Ciba Corporation/12.43 grams,
Reaction product of beta-3-(2H-benzotriazole-2-yl)-4-hydroxy-5-tert-butylphenyl propionic acid, methyl ester and polyethylene glycol 300, ultraviolet absorber, Tinuvin® 1130 from Ciba Corporation/12.57 grams, and
Acid catalyst solution/5.33 grams. This solution consists of Cycat® 600 (aromatic sulfonic acid from American Cyanamid) 48% AMP-95® (amine from Angus Chemical) 11% and methanol 41%.

Preparation of Microgel

A dispersed polymer microgel was prepared by charging the following constituents into a polymerization reactor equipped with a heat source and a reflux condenser. Microgel when used in following examples was prepared by this procedure.

| | Parts by Weight |
|---|---|
| Portion I | |
| Mineral Spirits (b.p. 157–210° C.) | 97.614 |
| Heptane | 37.039 |
| 2,2'-azobis(2-methylbutanenitrile) | 1.395 |
| Methacrylate copolymer stabilizer | 4.678 |
| Methyl methacrylate monomer | 15.187 |
| Portion II | |
| Methyl methacrylate monomer | 178.952 |
| Styrene monomer | 75.302 |
| Hydroxyethyl acrylate monomer | 23.455 |
| Mineral Spirits (b.p. range 157–210° C.) | 32.387 |
| Heptane | 191.896 |
| N,N-dimethylethanolamine | 1.108 |
| Glycidyl methacrylate monomer | 2.816 |
| Methacrylate copolymer stabilizer | 58.271 |
| Methacrylic acid monomer | 2.816 |
| Portion III | |
| Toluene | 12.938 |
| Heptane | 30.319 |
| 2,2'-azobis(2-methylbutanenitrile) | 2.024 |
| Portion IV | |
| Heptane | 16.204 |
| Portion V | |
| Methylated/butylated melamine formaldehyde resin | 246.300 |
| Total | 1067.300 |

Portion I was charged to the reaction vessel and heated to its reflux temperature. It was held at reflux for 60 minutes. Then Portions II and III were added simultaneously over a 180 minute period, while maintaining the resulting reaction mixture at its reflux temperature. Then Portion IV was dumped to the reactor and the reaction mixture was held a reflux for 120 minutes. Excess solvent (246.3 parts) was then stripped off and the reactor contents cooled to 215° F. After cooling, Portion V was added and mixed 30 minutes while continuing to cool to 140° F. The resulting dispersion was at 70.0% weight solids.

Preparation of Non-Aqueous Dispersion (NAD)

A nonaqueous acrylic resin dispersion was prepared by charging the following constituents into a reaction vessel equipped with a stirrer, a heating source and a reflux condenser:

| | Parts by Weight |
|---|---|
| Portion 1 | |
| Isopropanol | 179.26 |
| Acrylic Polymer Solution | 2254.05 |
| (52% solids of an acrylic polymer of 15% styrene, | |
| 28% butyl methacrylate, 30% butyl acrylate, | |
| 10% hydroxyethyl acrylate, 2% acrylic acid and | |
| 15% ethyl methacrylate having a weight average | |
| MW of 10,000 in a solvent mixture of 82.2% xylene | |
| and 17.8% butanol) | |
| Mineral spirits | 255.65 |
| Heptane | 1912.46 |
| Portion 2 | |
| Heptane | 28.75 |
| t-butyl peroctoate | 4.68 |
| Portion 3 | |
| Methylmethacrylate monomer | 1459.69 |
| Hydroxyethyl acrylate monomer | 784.81 |
| Styrene monomer | 156.97 |
| Portion 4 | |
| Acrylic Polymer solution | 1126.52 |
| (53% solids of an acrylic polymer of 15% styrene | |
| 28% butyl methacrylate, 30% butyl acrylate, | |
| 10% hydroxyethyl acrylate, 2% acrylic acid | |
| and 15% ethyl methacrylate 2.7% glycidyl | |
| methacrylate having a weight average Mw of | |
| 10,000 in a solvent mixture of 82.2% xylene | |
| and 17.8% butanol) | |
| Methyl methacrylate monomer | 125.57 |
| Methyl acrylate monomer | 565.06 |
| Glycidyl methacrylate monomer | 47.05 |
| Heptane | 17.25 |
| Portion 5 | |
| Mineral spirits | 638.63 |
| t-butyl peroctoate | 47.14 |
| Isobutanol | 127.31 |
| Portion 6 | |
| t-butyl peroctoate | 30.96 |
| Isobutanol | 255.65 |
| Portion 7 | |
| Heptane | 167.25 |
| Total | 10,184.71 |

Portion 1 is charged into the reaction vessel and heated to its reflux temperature. Portion 2 is added to the reaction vessel, mixed, and held at reflux temperature for 2 minutes. Then Portions 3 and 4 are added simultaneously with Portion 5 over a 210 minute period to the reaction vessel while maintaining the resulting reaction mixture at its reflux temperature. Then the mixture is held at its reflux temperature for an additional 45 minutes. Portion 6 is added over a 90 minute period while maintaining the reaction mixture at its reflux temperature and then held at this temperature for an additional 90 minutes. Portion 7 is added and excess solvent is stripped off to give a 60% solids acrylic resin dispersion.

TABLE 1

Where Component I is 4-VCH-Si$_2$/HBPA (Silanated 4-Vinyl-1-Cyclohexene/Hydrogenated Bis-Phenol A) Silane/Silicate Hybrid Oligomers

| Procedure No. | VCH/OH | Catalyst(%)[a] Nafion® | TFA | Temp. (°C.) | Time (hour) | MeOH (%)[b] | Conv.[c] VCH | VCH/OH | Visc. (poise) | Color (b)[d] Crude | Filter |
|---|---|---|---|---|---|---|---|---|---|---|---|
| 1 | 1.17 | 3.1 | 0.19 | 119 | 6 | | | | | | |
| | | | | 85 | 22 | | 73 | | 22 | | 1.8 |
| 2 | 1.17 | 3.1 | 0.19 | 120 | 5 | 86 | | | 9.8 | | |
| | | | | 120 | 7 | 89 | 66 | 0.87 | 14 | 3.9 | 1.2[f] |
| 3 | 1.17 | 3.1 | 0.19 | 120 | 3 | 82 | | | 6.1 | | |
| | | | | 120 | 5 | 86 | 64 | 0.87 | 12 | 2.7 | 0.7[f] |
| 4 | 1.20 | 0.77 | 0.77 | 120 | 5 | 87 | | | 5.6 | 6.5 | |
| | | | | 120 | 8 | 89 | 65 | 0.88 | 7.0 | 7.6 | 1.8 |
| 5 | 1.20 | | 0.77 | 120 | 5 | 84 | | | 6.2 | 7.5 | |
| | | | | 120 | 8 | 89 | 61 | 0.82 | 7.9 | 10.1 | 1.6 |
| 6 | 1.20 | | 0.15 | 142 | 2 | 82 | | | 4.9 | 3.1 | |
| | | | | 142 | 5 | 87 | 60 | 0.83 | 7.3 | 6.6 | 0.8 |
| 7 | 1.20 | | 0.15 +0.15 P–H[f] | 135 | 5 | 87 | | | 5.0 | 2.1 | |
| | | | | 136 | 9 | 90 | 60 | 0.80 | 7.6 | 2.7 | 0.5[e] |
| 8 | 0.78 | 0.50 | 0.10 | 140 | 2 | 78 | 80 | 0.80 | 83 | 2.9 | 0.3 |
| 9 | 0.90 | 0.50 | 0.10 | 120 | 5 | 66 | | | 18 | | |
| | | | | 95 | 8 | 73 | 75 | 0.92 | 30 | 2.6 | 0.8 |
| 10 | 1.10 | 3.8 | 0.15 | 120 | 5 | 87 | | | 15 | 4.7 | |
| | | | | 120 | 8 | 90 | 82 | 0.99 | 19 | 5.5 | 2.7 |
| 11 | 1.15 | 3.8 | 0.15 | 120 | 5 | 87 | | | 10 | 6.9 | |
| | | | | 120 | 8 | 90 | 75 | 0.96 | 15 | 8.9 | 3.7 |
| 12 | 1.20 | 3.8 | 0.15 | 120 | 5 | 89 | | | 8.0 | 5.8 | |
| | | | | 120 | 8 | 92 | 72 | 0.94 | 12 | 8.0 | 3.1 |
| 13 | 1.25 | 3.8 | 0.15 | 120 | 5 | 86 | | | 5.4 | 6.6 | |
| | | | | 120 | 8 | 89 | 73 | 1.03 | 7.8 | 8.5 | 3.1 |

[a]Nafion = NR-50; TFA = CF$_3$CO$_2$H
[b]MeOH yield (%) = MeOH collected/2 × HBPA (mole/mole) × 100%
[c]VCH conversion (%) by GC; VC/OH = VCH conversion/MeOH yield (mole/mole)
[d]Filtr.-after filtration through carbon/celite/silica/filter paper
[e]Filtration through celite/silica/filter paper only
[f]decolorizer added (P–H = 9, 10-dihydro-9-oxa-10-phospha-phenanthrene-10-oxide)

TABLE 2

Where Component I is 4-VCH-Si$_2$/HBPA Hybrid Oligomers

| Procedure No. | VCH/OH | Catalyst(%)[a] R$_4$NOH | Temp. (°C.) | Time (hour) | MeOH (%)[b] | Conv.[c] VCH | VCH/OH | Visc. (poise) | Color (b)[d] Crude | Filter |
|---|---|---|---|---|---|---|---|---|---|---|
| 14 | 1.20 | 1.26 (Me) | 105 | 5 | 68 | | | 4.8 | (H)1.3 | |
| | | | 110 | 7 | 71 | | | 5.2 | (H)1.1 | |
| | | | 140 | 9 | 75 | 59 | 0.94 | 6.3 | (H)1.4 | 0.05 |
| 15 | 1.20 | 0.30 (Me)/MS | 107 | 5 | 79 | | | 5.1 | (H)1.2 | |
| | | | 145 | 8 | 85 | 53 | 0.75 | 5.6 | (H)1.1 | 0.5e |
| 16 | 1.20 | 0.19 (Bu) | 106 | 5 | 74 | | | 6.0 | (H)1.3 | |
| | | | 135 | 7 | 81 | 58 | 0.86 | 8.1 | (H)2.5 | 0.10 |
| 17 | 1.20 | 0.19 (Bu)/MS | 110 | 5 | 79 | | | 5.3 | 1.0 | |
| | | | 110 | 7 | 80 | | | 0.9 | | |
| | | | 138 | 8.5 | 84 | 61 | 0.87 | 7.3 | 1.2 | 0.02 |

[a]R$_4$NOH, where R = Me, Bu MS-purified over molecular sieves
[b]MeOH yield (%) = MeOH collected/2 × HBPA (mole/mole) × 100%
[c]VCH conversion (%) by GC VCH/OH = VCH conversion/MeOH yield (mole/mole)
[d]Filtr.-after filtration through carbon/celite/silica/filter paper
[e]Filtration through celite/silica/filter paper only
H = hazy.

TABLE 3

Polyol Silicates (Component I)

| Procedure No. | Reaction Mixture Polyol/Silane | Si/OH | Product Viscosity (poise) | Color (b) |
|---|---|---|---|---|
| 18 | Hydrogenated Bisphenol A/(MeO)$_4$Si | 1.30 | 3.6 | +8.3 |
| 19 | Hydrogenated Bisphenol A/Me(MeO)$_3$Si | 1.57 | 3.2 | |
| 20 | Cyclohexanedimethanol/(MeO)$_4$Si | 1.20 | 0.6 | +7.6 |
| 21 | Cycloxexanedimethanol/Me(MeO)$_3$Si | 1.32 | 0.4 | |
| 22 | Cyclohexanedimethanol/Pr(MeO)$_3$Si | 1.32 | 0.2 | |
| 23 | Neopentyl Glycol/(MeO)$_4$Si | 1.32 | 0.1 | |
| 24 | Neopentyl Glycol/Me(MeO)$_3$Si | 1.34 | 0.1 | +0.03 |
| 25 | 1,4-Cyclohexanediol/Me(MeO)$_3$Si | 1.37 | 0.1 | |
| 26 | 2,5-Dimethyl-2,5,hexanediol/Me(MeO)$_3$Si | 1.34 | 0.1 | |
| 27 | Pinacol/Me(MeO)$_3$Si | 2.39 | 0.1 | |
| 28 | 1,6-Hexanediol/Me(MeO)$_3$Si | 1.30 | 0.1 | |
| 29 | 1,8-Octanediol/Me(MeO)$_3$Si | 1.34 | 0.1 | |
| 30 | 1,10-Decadiol/Me(MeO)$_3$Si | 1.60 | 0.1 | |
| 31 | 1,12-Dodecanediol/Me(MeO)$_3$Si | 1.34 | 0.2 | |
| 32 | Polycaprolactone diol (MW530)/Me(MeO)$_3$Si | 1.95 | 2.1 | |

Example 1

A clearcoat was formulated by blending together the following constituents in the order:

| Material | Company Code | Parts by Weight |
|---|---|---|
| Methylated/Butylated Melamine formaldehyde resin | Resimene ® CE-6550 Monsanto Company | 15.34 |
| Non-aqueous Dispersion | NAD, Procedure Given | 38.17 |
| Hydrogenated Bisphenol-A/ Disilanated 4-vinylcyclohexene | HBPA/4-VCH Procedure Given | 22.81 |
| Stabilizer Package | Procedure Given | 11.60 |
| Acrylic Polyol | Procedure Given | 17.60 |
| CHDM/Bis(isocyanatopropyl trimethoxysilane) | Procedure Given | 11.86 |
| Acid Catalyst Solution | Cycat ® 600, Cytec | 5.30 |
| Dibutyltin dilaurate | Fascat 4202, Elf Atochem | 0.20 |
| Acrylosilane Resin (V) | Procedure given | 14.47 |
| Acrylic Terpolymer | Resiflow ® S Estron Chemical | 0.40 |

The coating was sprayed over a black, solvent-borne basecoat which was not previously cured. The coating was cured for 30 minutes at 141° C. The coating exhibited significantly better mar resistance than a standard clearcoat.

Example 2

A clearcoat was formulated by blending together the ingredients in Example 1 except that the acrylic polyol was replaced with 23.88 parts silanated acrylic polyol (procedure given) and acrylosilane resin and CHDM/Bis(isocyanatopropyltrimethoxysilane) were replaced with 20.46 parts of dual functional acrylosilane resin.

The coating was sprayed over a black, solvent-borne basecoat which was not previously cured. The coating was cured for 30 minutes at 141° C. to give a hard glossy clearcoat.

Example 3

A clearcoat was formulated by blending together the following constituents in the order:

| Material | Company Code | Parts by Weight |
|---|---|---|
| Microgel Rheology Agent | Procedure Given | 43.1 |
| Methylated/Butylated Melamine formaldehyde resin | Resimene ® CE-6550 Monsanto Company | 65.5 |
| Trimethylorthoformate | Huls America | 30.2 |
| Benzotriazole UV Screener | Tinuvin ® 384 | 2.0 |
| Light Stabilizer | Tinuvin ® 123 | 2.0 |
| Acrylic Terpolymer | Resiflow ® S, Estron Chem. | 0.4 |
| Acrylosilane Resin | Procedure Given | 313.2 |
| Silica/Melamine Dispersion | DuPont | 58.4 |
| Non-aqueous Dispersion | NAD, Procedure Given | 230.2 |
| Acrylic Polyol | Procedure Given | 53.7 |
| CHDM/Bis(isocyanatopropyl trimethoxysilane) | Procedure Given | 75.4 |
| Tris(methoxy/diethoxysilylpropyl)-isocyanurate | OSI | 75.4 |
| Dibutyltin diacetate | Fascat 4200, Elf Atochem | 0.8 |
| Acid Catalyst Solution | Cycat ® 600, Cytec | 20.1 |

The coating was sprayed over a solvent-borne basecoat which was not previously cured and cured for 30 minutes at 129° C. This clearcoat showed very good appearance with 20° gloss of 90 and distinctness of image of 87. Compared to a totally melamine crosslinked system which has an acid rain resistance rating of 12 (on a scale of 0–12 with 0 best) this system had a very good rating of 5. This acid rain resistance is at least equal to isocyanate systems but this clearcoat has the advantage of being a stable one component system, not requiring mixing just prior to use.

Example 4

A clearcoat was formulated by blending together the ingredients in Example 3 except that the tris(methoxy/diethoxysilylpropyl)isocyanurate was eliminated and 150.8 parts of CHDM/Bis(isocyanatopropyltrimethoxysilane) were added.

The coating was sprayed over a solvent-borne basecoat which was not previously cured and cured for 30 minutes at 129° C. This clearcoat showed very good appearance with 20° gloss of 92 and distinctness of image of 89. This system had a very good acid rain resistance rating of 4 and very good mar performance on a Taber Abraser of 70 (scale 0–100, 100 best).

Example 5

A clearcoat was formulated by blending together the ingredients in Example 3 except that the tris(methoxy/diethoxysilylpropyl)isocyanurate was replaced with 75.4 parts of an adduct of 2-vinyl-4-ethyl-4-hydroxyethyl-1,3-dioxane/caprolactone/tetraethyl orthosilicate.

The coating was sprayed over a solvent-borne basecoat which was not previously cured and cured for 30 minutes at 129° C. This clearcoat showed excellent appearance with 20° gloss of 93 and distinctness of image of 93. This clearcoat had a mar resistance rating of 80 (scale 0–100, 100 best) as measured in an aluminum oxide slurry rubtest evaluated by optical imaging.

Example 6

A clearcoat was formulated by blending together the ingredients in Example 3 except that the tris(methoxy/diethoxysilylpropyl)isocyanurate was replaced with 75.4 parts of a di-adduct of 1,4-cyclohexanedimethanol and tetramethyl orthosilicate.

The coating was sprayed over a solvent-borne basecoat which was not previously cured and cured for 30 minutes at 129° C. This clearcoat showed excellent appearance with 20° gloss of 94 and distinctness of image of 89. This clearcoat showed a balance of very good etch, (rating of 5), and scratch and mar resistance, (rating of 74).

Example 7

The clearcoat from Example 6 was applied over a water-borne basecoat that had been baked for 5 minutes at 180° F. Excellent appearance with 20° Gloss of 91 and Distinctness of image of 88 was found. Acid rain and mar resistance were identical to the coating applied over the solvent borne basecoat.

Example 8

A clearcoat was formulated by blending together the ingredients in Example 3 except that the microgel, melamine and acrylic polyol resin were eliminated and the amount of tris(methoxy/diethoxysilylpropyl)isocyanurate was increased to 218.2 parts.

The coating was sprayed over a solvent-borne basecoat which was not previously cured and cured for 30 minutes at 129° C. This clearcoat showed excellent appearance with 20° gloss of 96 and distinctness of image of 85. This clearcoat had particularly good scratch and mar resistance with a rating of 83.

Example 9

A clearcoat was formulated by blending together the following constituents in the order:

| Material | Company Code | Parts by Weight |
|---|---|---|
| Non-aqueous Dispersion | NAD, Procedure Given | 264.6 |
| Alkylated amino resin | Cymel ® 1161, Cytec | 65.0 |
| CHDM/Bis(isocyanatopropyl trimethoxysilane) | Procedure Given | 462.3 |
| Acrylosilane Resin | Procedure Given | 184.5 |

-continued

| Material | Company Code | Parts by Weight |
|---|---|---|
| Dibutyltin diacetate | Fascat 4200, Elf Atochem | 1.7 |
| Acid Catalyst Solution | Cycat ® 600, Cytec | 19.3 |
| Ethyl-3-ethoxy propionate | Eastman Chemicals | 2.6 |

The coating was sprayed over a solvent-borne basecoat which was not previously cured and cured for 30 minutes at 141° C. This clearcoat showed very good appearance with 20° gloss of 88 and distinctness of image of 90. The scratch and mar resistance is very good with a rating of 83. This clearcoat gives a hard (14.75 knoop), solvent (100 MEK rubs) and impact (180 in/lbs) resistant finish. The particular advantage of this clearcoat is the very low Volatile Organic Content (VOC) of less than 1.5 lb/gal which compares to 3.8 lb/gal for current commercial materials.

Example 10

The clearcoat formula in Example 9 with the addition of 15.9 parts of Benzotriazole UV Screener Tinuvin® 384, and 15.1 parts of light stabilizer, Tinuvin® 123, to provide a coating with improved outdoor durability.

We claim:

1. A coating composition comprsing:

component (I) comprising from 0 to 50 percent of the reaction product of a polyol of the formula

with

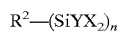

the reaction product heaving a weight average molecular weight less than about 10,000;

component (II) comprising from 0 to 50 percent of a graft copolymer comprising a backbone of acrylic polymer and, grafted thereto, a plurality of substantially linear stabilizer arms containing at least about 2 percent of ethylenically unsaturated monomer with functionality that reacts with at least one of components I, III and V, the backbone being substantially insoluble and the stabilizer arms being substantially soluble in the composition;

component (III) comprising from 0 to 30 of an alkylated melamine formaldehyde crosslinking agent;

component (IV) comprising from 0 to 40 of an organic polyol polymer having a hydroxyl number of about 50 to 200 and a weight average molecular weight of about 1,000 to 20,000;

component (V) comprising from 0 to 50 of a silane functional polymer which is the reaction product of about 5 to 70 percent by weight of ethylenically unsaturated silane-containing monomers selected from the group consisting of alkoxysilane monomers, acyloxysilane monomers, and mixtures thereof, with about 30 to 95 percent by weight of ethylenically unsaturated non-silane containing monomers selected from the group consisting of styrene; alkyl acrylate and aklyl methacrylate where the alkyl groups have 1 to 12 carbon atoms; cycloaliphatic acrylates; cycloaliphatic methacryates; aryl acrylates; aryl methacrylates; acrylamide; methacrylamide; acrylonitrile; methacrylonitrile; hydroxyalkyl acrylates and hydroxy alkyl methacrylates where the alkyl group has 1 to 4 carbon atoms; and mixtures thereof;

component (VI) comprising from 0 to 50 percent of the reaction product of a polyol of the formula

with an alkoxysilane of the formula

wherein:

$R^1$ is selected from the group consisting of
  a) $C_2$ to $C_{20}$ alkyl; cycloaliphatic or aromatic rings, each optionally substituted with at least one member selected from the group consisting of O, N, P and S;
  b) two or more cycloaliphatic or aromatic rings connected to each other through a covalent bond, or through an alkylene group of 1 to 5 carbon atoms, or through a heteroatom, or fused together to share two or more carbon atoms, each optionally substituted with a member selected from the group consisting of O, N, P and S; and
  c) linear polyester, branched polyester, linear and branched polyester, polyether, polycarbonate, polyurethane, polyacrylate, polyolefin, or polyamide, each such group having a weight average molecular weight between about 300 and 10,000;

$R^2$ is selected from the group consisting of
  a) $C_1$ to $C_{20}$ allkyl, cycloaliphatic or aromatic rings, each optionally substituted with a member selected from the group consisting of O, N, P and S; and
  b) two or more cycloaliphatic or aromatic rings connected to each other through a covalent bond, or through an alkylene group of 1to 5 carbon atoms, or through a heteroatom, or fused together to shaere two or more carbon atoms, each optionally substituted with a member selected from the group consisting of O, N, P and S;

$R^3$ is selected from tlhe group consisting of
  a) $C_2$ to $C_{20}$ alkyl, cycloaliphatic or aromatic rings, each optionally substituted with a member selected from the group consisting of O, N, P and S;
  b) two or more cycloaliphatic or aromatic rings, each connected to each other through a covalent bond, or through an alkylene group of 1 to 5 carbon atoms, or through a heteroatom, or fused together to share two or more carbon atoms, each optionally substituted with a member selected from the group consisting of O, N, P and S; and
  c) linear polyester, branched polyester, linear and branched polyester, polyether, polycarbonate, polyurethane, polyacrylate, polyolefin, or polyamide, each such group having a weight average molecular weight of less than 3,000;

$R^4$ is selected from the group consisting of alkyl of 1 to 12 carbon atoms, alkoxy containing 1 to 4 carbon atoms;

$R^5$ is selected from the group consisting of alkyl of 1 to 12 carbon atoms;

X is independently selected from the group consisting of alkoxy containing 1 to 20 carbon atoms, acyloxy containing 1 to 20 carbon atoms, phenoxy, halogens, amine, amide, urea, imidazole, carbamate, ketoximine, and oxazolidinone;

Y is selected from the group consisting of alkyl of 1 to 12 carbon atoms, alkoxy containing 1 to 20 carbon atoms, acyloxy containing 1 to 20 carbon atoms, phenoxy, halogen, amine, amide, urea, imidazole, carbamate, ketoximine, and oxazolidinone;

m is a positive integer of 2 or higher; and n is a positive integer of 1 or higher;

p is a positive integer of 2 or higher; and t is a positive integer of 1 to 8;

wherein I≠VI and 5 to 75 percent by weight of the composition is one or both of the components I and VI, remainder being one or more of the components II to V such that the sum of the percentages of the components I–VI is 100 percent and wberein all the weight percentages are based on the total weight of the components I to V.

2. The composition according to claim 1 wherein Component I has a molecular weight less than about 3,000; Component III is present at no more than 20 percent; and Components IV and V are each independently present from 15 to 20 percent.

3. The composition according to claim 1 wherein V is derived from the ethylenically unsaturated silane-containing monomer:

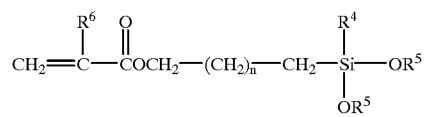

in which $R^4$ is selected from the group consisting of $CH_3$, $CH_3CH_2$, $CH_3O$, $CH_3CH_2O$; $R^5$ is independently selected from the group consisting of $CH_3$ and $CH_3CH_2$; $R^6$ is selected from the group consisting of H and $C_1$ to $C_{12}$ alkyl; and n is 0 or a positive integer from 1 to 10.

4. The composition according to claim 1 wherein V is derived from the ethylenically unsaturated silane-containing monomer:

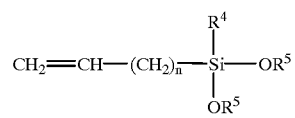

wherein $R^4$ is selected from the group consisting of $CH_3$, $CH_3CH_2$, $CH_3O$, and $CH_3CH_2$; $R^5$ is independently selected from the group consisting of $CH_3$ and $CH_3CH_2$; and n is 0 or a positive integer from 1 to 10.

5. The composition according to claim 1 wherein V is derived from the ethylenically unsaturated silane-containing monomer:

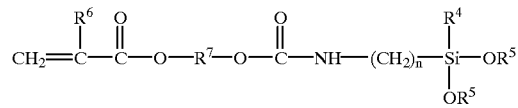

wherein $R^4$ is selected from the group consisting of $CH_3$, $CH_3CH_2$, $CH_3O$, and $CH_3CH_2O$; $R^5$ is independently selected from the group consisting of either $CH_3$ and $CH_3CH_2$; $R^6$ is selected from the group consisting of H and $C_1$ to $C_{12}$ alkyl; $R^7$ is an alkylene group having 1 to 8 carbon atoms and n is a positive integer from 1 to 10.

6. A composition according to claim 1 wherein VI is the cyclosilane reaction product formed from cyclohexanedimethanol and 3-isocyanopropyltrimethoxysilane.

7. The composition according to claim 1 wherein I is the reaction product formed by disilylated 4-vinyl-1-cyclohexene.

8. The composition according to claim 1 wherein I is the reaction product formed by disilylated limonene.

9. The composition according to claim 1 wherein I is the reaction product formed by disilylated 5-vinyl-2-norbornene.

10. The composition according to claim 1 wherein I is the reaction product of a polyol with at least one member of the group consisting of tetramethoxysilane, methyltrimethoxysilane, ethyltrimethoxysilane, propyltrimethoxysilane, butyltrimethoxysilane, octyltrimethoxysilane, phenyltrimethoxysilane, and vinyltrimethoxysilane.

11. The composition according to claim 1 wherein at least one of I and VI is the reaction product formed by cyclohexanedimethanol and hydrogenated Bisphenol A.

12. The composition according to claim 1 wherein at least one of the components I and VI is the reaction product of a polyester polyol formed from at least one member of the group consisting of a simple diol, triol and tetrol reacted with methylhexaphthalic anhydride, followed by reaction with an epoxidized ester of $C_2$ to $C_{10}$ carboxylic acid.

13. The composition according to claim 1 wherein at least one of I and VI is derived from an acrylic polyol polymer.

14. The composition according to claim 13 comprising a total of about 20 to 60 percent of one or both of components I and VI and about 20 percent of component V.

15. The composition according to claim 1 wherein the average particle size of II is 0.1 to 0.5 microns.

16. The composition according to claim 1 wherein the composition contains about 0.1–5 percent by total weight of at least one catalyst selected from the group consisting of tin, titanium, aluminum, zirconium, amine and acid catalyst.

17. The method for protecting a substrate comprising coating the substrate with a composition of claim 1.

18. The substrate coated with the composition of claim 1.

19. The coating composition of claim 1 comprising the components (III) and (IV) wherein the component (III) comprises from 0 to 20 percent of an alkylated melamine formaldehyde crosslinking agent.

20. The coating composition of claim 1 comprising 15 to 20 percent of the component (IV).

21. The coating composition of claim 1, 19 or 20 wherein said m is 2 to 30.

22. The coating composition of claim 1, 19, or 20 wherein said n is 1 to 3.

23. The coating composition of claim 1, 19 or 20 wherein said p is 2 to 30.

24. The coating composition of claim 1, 19 or 20 wherein said t is 1 to 8.

25. The coating composition of claim 1 wherein the organic polyol polymer of the Component IV is an acrylic polymer containing polymerized monomers selected from the group consisting of styrene; alkyl methacrylates and alkyl acrylates where the alkyl group has 1 to 12 carbon atoms; cycloaliphatic acrylates; cycloaliphatic methacrylates; aryl acrylates; aryl methacrylates; acrylamide; methacrylamide; acrylonitrile; methacrylonitrile; hydroxyalkyl acrylates and hydroxyalkyl methacrylates where the alkyl group has 1 to 4 carbon atoms; and mixtures thereof.

* * * * *

UNITED STATES PATENT AND TRADEMARK OFFICE
CERTIFICATE OF CORRECTION

PATENT NO. : 6,080,816
DATED : June 27, 2000
INVENTOR(S) : Gregorovich et al.

It is certified that error appears in the above-identified patent and that said Letters Patent is hereby corrected as shown below:

<u>Column 24, claim 1,</u>
Line 38, "heaving" should be -- having --.

<u>Column 25, claim 1,</u>
Line 37, "shaere" should be -- share --.

<u>Column 26, claim 1,</u>
Line 14, "wberein" should be -- wherein --.

Signed and Sealed this

Fourth Day of December, 2001

Attest:

NICHOLAS P. GODICI
Attesting Officer
Acting Director of the United States Patent and Trademark Office